United States Patent [19]

Anderson et al.

[11] 4,195,722
[45] Apr. 1, 1980

[54] CIRCUIT FOR A POWER OPERATED MACHINE

[75] Inventors: Larry L. Anderson, Mequon, Wis.; Lawrence W. Shumaker, Winthrop Harbor, Ill.; Russell J. Van Rens, Milwaukee, Wis.

[73] Assignee: Outboard Marine Corporation, Waukegan, Ill.

[21] Appl. No.: 897,855

[22] Filed: Apr. 19, 1978

[51] Int. Cl.² ............................ F16P 3/06; F16P 3/20
[52] U.S. Cl. .................................. 192/131 R; 74/615; 74/616; 100/53; 192/131 H; 200/DIG. 2
[58] Field of Search ........................ 192/131 R, 131 H; 74/615, 616; 100/53; 200/61.45 R, 61.48, 61.58 R, DIG. 2

[56] References Cited

U.S. PATENT DOCUMENTS

| 2,013,441 | 9/1935 | Goff et al. | 192/131 H |
| 2,152,045 | 3/1939 | Gulland | 200/DIG. 2 |
| 2,680,216 | 6/1954 | Schmidt | 192/131 R X |
| 3,011,610 | 12/1961 | Stiebel | 192/131 R |
| 3,522,868 | 8/1970 | Genger | 192/131 R |

Primary Examiner—Allan D. Herrmann
Attorney, Agent, or Firm—Michael, Best & Friedrich

[57] ABSTRACT

A circuit interconnecting a source of electrical energy with a power operated machine. The circuit comprises an interlock device including a motion switch which is adapted to be removably attached to the machine operator's body. The motion switch is movable between a normally deactivated position to prevent the flow of electrical energy from the source to the machine and an activated position to permit the flow of electrical energy from the source to the machine for operating the machine. The motion switch is operable to be moved to the activated position in response to movement of the operator's body.

12 Claims, 2 Drawing Figures

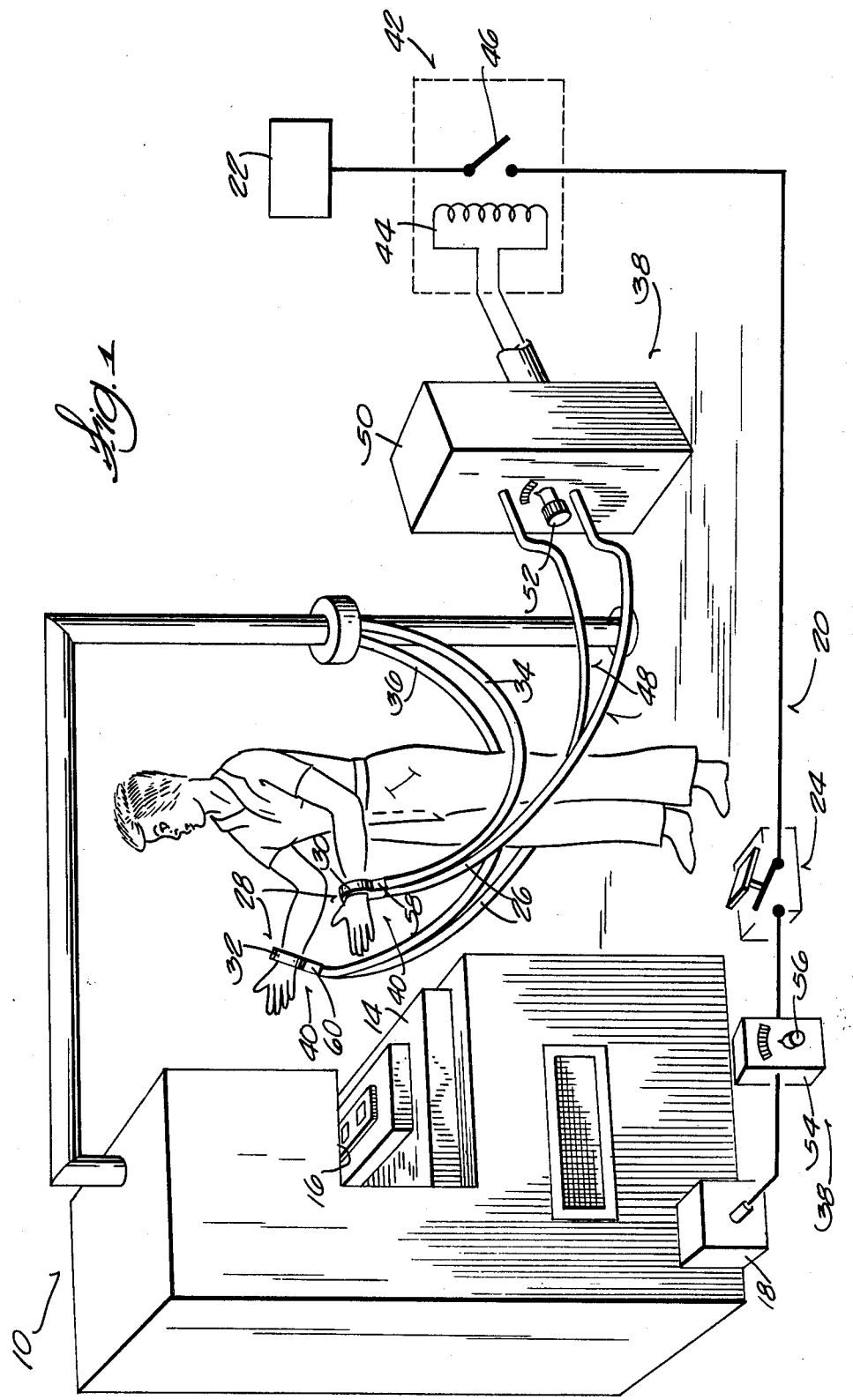

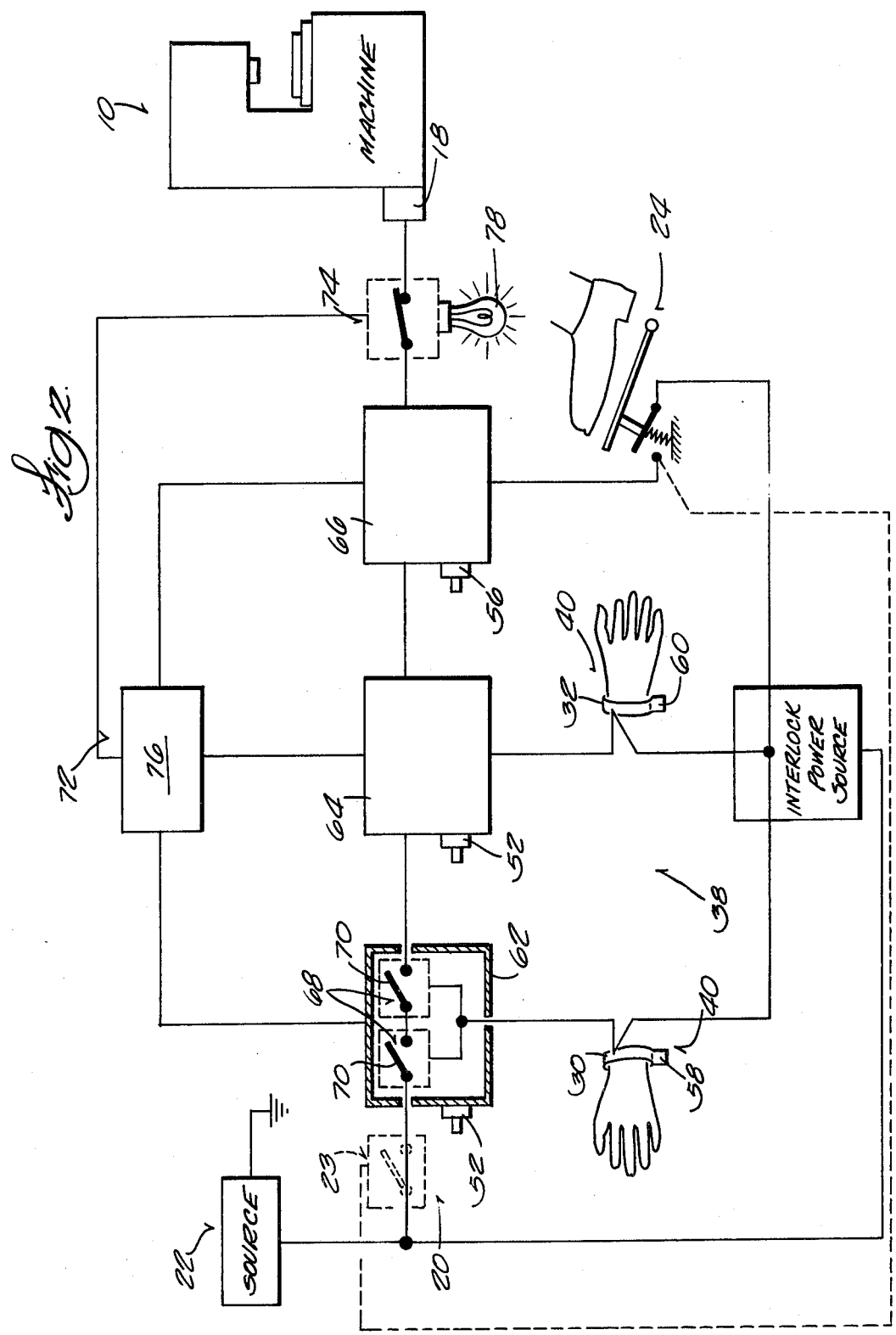

CIRCUIT FOR A POWER OPERATED MACHINE

BACKGROUND OF THE INVENTION

The invention relates generally to electrical circuits for power operated machines. More particularly, the invention relates to circuits having interlock devices which require the movement of the machine operator's body to provide a continuous flow of electrical energy to the enabling circuits of the machine.

Retraction devices employing cables which are connected at one end to the reciprocal work forming member of a conventional power press and connected at the other end to the press operator's wrists by wrist cuffs are known. As the work forming member descends, the cables are retracted to forcibly withdraw the operator's hands from the path of the work forming member. Prior art constructions for retraction devices provide various means to render the press inoperative whenever the operator does not use the wrist cuffs. Examples of prior art constructions are disclosed in the following U.S. Pat. Nos.: Valkaitis, 2,978,084; Apr. 4, 1961; Stiebel et al, 3,011,610; Dec. 5, 1961; Stiebel et al, 3,047,116; July 31, 1962; Genger, 3,522,868; Aug. 4, 1970; Wingle, 3,804,002; Apr. 16, 1974; Williamson, 3,884,336; May 20, 1975.

SUMMARY OF THE INVENTION

The invention provides a circuit interconnecting a source of electrical energy with a power operated machine. The circuit comprises interlock means including motion switching means which is adapted to be removably attached to the machine operator's body and is movable between a normally deactivated position to prevent the flow of electrical energy from the source to the machine and an activated position to permit the flow of electrical energy from the source to the machine for operating the machine. The motion switching means is operable to be moved to the activated position in response to movement of the operator's body.

In accordance with one embodiment of the invention, the interlock means further includes motion switch timing means operable, in response to movement of the motion switching means to the activated position, to permit the flow of electrical energy from the source to the machine for a predetermined time interval after the motion switching means has been moved to the activated position. In this embodiment, the motion switch timing means further includes means for adjusting the predetermined time interval.

In accordance with another embodiment of the invention, the interlock means further includes manual control means connected to the motion switch timing means and movable between a normally off position to prevent the flow of electrical energy from the source of the machine, notwithstanding the operation of the motion switch timing means to permit the flow, and an on position to permit the flow of electrical energy from the source to the machine when the motion switch timing means operates to permit the flow. The manual control means is operable to be moved to the on position by the machine operator.

In accordance with another embodiment of the invention, the interlock means further includes manual control timing means operable, in response to movement of the manual control means to the on position when the motion switch timing means operates to permit the flow, to permit the flow of electrical energy from the source to the machine for a predetermined time interval after the manual control means has been moved to the on position.

In accordance with the preferred embodiment of the invention, the circuit is interconnected to a power press including an electrically actuated power means interconnected with the electrical energy source by the circuit, a work bed, and a work forming member drivingly connected to the power means and mounted for reciprocative movement relative to the work bed. The power press further includes retraction means having an attachable portion removably attached to at least one of the operator's wrists, the retraction means being operable for forcibly removing the operator's hands from the vicinity of the work bed in response to movement of the work forming member toward the work bed. In this embodiment, the motion switching means is carried by the attachable portion and moved to the activated position in response to movement of the operator's hands.

One of the principal features of the invention is the provision of a circuit having interlock means for a power operated machine, which interlock means operates in response to the movement of the machine operator's body.

Another of the principal features of the invention is the provision of a circuit having interlock means for use with a power press machine including a conventional hand retraction device, which interlock means requires the use of the hand retraction device to operate the work forming member of the power press.

Other features and advantages of the embodiments of the invention will become apparent upon reviewing the following general description, drawings, and the appended claims.

DESCRIPTION OF THE DRAWINGS

FIG. 1 is a perspective and partially diagrammatic view of a circuit interconnecting a source of electrical energy to a power press machine, which circuit embodies various of the features of the invention; and FIG. 2 is a block electrical diagram of the circuit illustrated in FIG. 1.

Before explaining the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown in FIG. 1 is a circuit 20 interconnecting a source of electrical energy 22 with a power operated machine 10, which circuit 20 embodies various of the features of the invention. While the invention is applicable for use with various types of power operated machines 10, in the illustrated embodiment, a power press machine is shown having a work bed 14 and a work forming member 16 mounted for reciprocative movement toward and away from the work bed 14. Electrically actuated power means 18 is operatively connected with the work forming member 16. Electrical energy is carried by the circuit 20 from the source 22 to the power means 18 to drive the work forming member 16.

The circuit 20 includes manual control means 24, such as a manually operable foot pedal, which is movable between a normally off position (as shown in FIG. 1) to prevent the flow of electrical energy from the source 22 to the power means 18 and an on position to permit the flow of electrical energy from the source 22 to the power means 18 to thereby operate the work forming member 16. The manual control means 24 is operable to be moved to the on position by the machine operator. The provision of the manual control means 24 prevents the work forming member 16 from cycling automatically, which helps to protect the machine operator from bodily injury while operating the power press 10.

To further protect the machine operator from bodily injury during operation of the work forming member 16, the power press 10 includes retraction means 26. The retraction means 26 includes an attachable portion 28 which is removably attachable to at least one of the machine operator's wrists and is operable for forcibly removing the hand from the vicinity of the work bed 14 when the work forming member 16 begins to move toward the work bed 14. As illustrated, the attachable portion 28 includes a left wrist cuff 30 and a right wrist cuff 32. A left retraction cable 34 and a right retraction cable 36 are connected at one end to the respective wrist cuffs 30 and 32 and are operatively connected at the other end to the work forming member 16 for retracting the left and right retraction cables 34 and 36, and thus the left and right wrist cuffs 30 and 32, from the vicinity of the work bed 14 as the work forming member 16 begins to move toward the work bed 14.

As heretofore described, it is possible for the machine operator to defeat the protective purposes of both the manual control means 24 and the retraction means 26. The machine operator may continuously hold the manual control means 24 in the on position, which in effect causes the work forming member 16 to cycle automatically. In addition, the machine operator may forget or choose not to wear the wrist cuffs 30 and 32 and still operate the power press 10.

The circuit 20 includes interlock means 38 to frustrate the attempts of the machine operator to negate the protective purposes of the manual control means 24 and the retraction means 26.

Referring first to the interlock means 38 as it relates to the retraction means 26, the interlock means includes motion switching means 40, such as a conventional mercury switch, which is movable between a normally deactivated position to prevent the flow of electrical energy in the cicuit 20 and an activated position to permit the flow of electrical energy through the circuit 20. The motion switching means 40 is adapted to be removably attached to the machine operator's body and is operable to be moved to the activated position in response to movement of the operator's body.

As shown in FIG. 1, the motion switching means 40 is carried by the retraction means 26. It should be appreciated, however, that the interlock means 38 including the motion switching means 40 can be adapted for use in any situation where a machine operator is required to wear a device in order to protect himself from accidental bodily injury during operation of the machine. For example, instead of using retraction means 26 operatively connected to the work forming member 16, restraining cables (not illustrated) may be used which include wrist cuffs at one end and are at the opposite end passively anchored to an immovable object external to the machine. In this construction, the restraining cables are of such a length that the machine operator is physically restrained from placing his hands into the path of the work forming member when the wrist cuffs are worn. Thus, to insure that the wrist cuffs are worn, the interlock means 38 including the motion switching means 40 may be used. It should also be appreciated that the interlock means 38 including the motion switching means 40 is applicable for use with power operated machines other than a reciprocal power press, and in this respect, the motion switching means 40 may be carried by any part of the machine operator's body which is subject to movement during operation of the machine.

The circuit 20 illustrated in FIG. 1 is a simplified, schematic diagram intended to show the general electrical operation of the interlock means 38. A more specific electrical circuit is illustrated in FIG. 2 and will be described in detail later herein.

Referring first to FIG. 1, a main power switch 42 is included in the circuit 20. The main power switch 42 includes a coil 44 and a switch arm 46 having a normally open position (shown in FIG. 1) to prevent the flow of electrical energy in the circuit 20 and a closed position to permit the flow of electrical energy in the circuit 20. The switch arm 46 is movable to the closed position in response to the flow of electrical energy through the coil 44.

Electrical energy is carried to the coil 44 by coil circuit means 48. The motion switching means 40 is operatively interconnected with the coil circuit means 48 such that the flow of electrical energy to the coil 44 is prevented when the motion switching means 40 is in the deactivated position and permitted when the motion switching means 40 is in the activated position. Consequently, the machine operator must wear the retraction means 26 and continuously move his hands to move the motion switching means 40 to the activated position in order to maintain the switch arm 46 in the closed position and thereby permit the uninterrupted flow of electrical energy through the circuit 20.

Because of the job-related functions the machine operator must perform, it may be impractical to require continuous hand movement to operate the power press 10. Therefore, in the illustrated embodiment, the interlock means 38 further includes motion switch timing means 50 interconnected with the coil circuit means 48. The motion switch timing means 50 is a conventional relay which includes a timed monostable circuit (not illustrated). The motion switch timing means 50 is thereby operable in response to movement of the motion switching means 40 to the activated position, to permit the flow of electrical energy through the coil circuit means 48 for a definite, predetermined time period after the motion switching means 40 has been moved to the activated position. Because of the monostable circuitry within the motion switch timing means 50, the motion switching means 40 must be returned to the deactivated position by lack of operator hand movement and then be moved again to the activated position by movement of the operator's hands to again trigger the motion switch timing means 50.

The provision of the motion switch timing means 50 eliminates the need for continuous operator hand movement to provide an uninterrupted flow of electrical energy to the power press 10. A single movement of the operator's hand will close the switch arm 46 for an operative interval of predetermined time duration, during which operative interval the flow of electrical energy through the circuit 20 continues, notwithstanding the lack of subsequent movement of the operator's hand and the disposition of the motion switching means 40 in the deactivated position. Furthermore, any movement of the operator's hand during the operative interval will retrigger the motion switch timing means 50 and thereby establish another complete operative interval. Therefore, movement of the operator's hands in intervals less than the predetermined time period of the motion switch timing means 50 will maintain the switch arm 46 in the closed position and permit the uninterrupted flow of electrical energy in the circuit 20.

In the illustrated embodiment, the motion switch timing means 50 includes adjusting means 52, such as a conventional rheostat, for manually adjusting the length of the predetermined time period, and thus the length of the operative interval, to compensate for job cycle variations between different operators and different jobs.

Referring now to the interlock means 38 as it relates to the manual control means 24, the interlock means 38 further includes manual control timing means 54, again such as a conventional relay having a timed monostable circuit, interconnected with the circuit 20. The manual control timing means 54 operates in the identical way that the motion switch timing means 50 operates except that the motion control timing means 54 operates in response to movement of the manual control means 24. When the manual control means 24 is moved to the on position, the manual control timing means 54 permits the flow of electrical energy through the circuit 20 to the power means 18 for a definite, predetermined time period after the manual control means 24 has been moved to the on position. To again trigger the manual control timing means 54, the manual control switch 24 must be returned to the deactivated position and then moved again to the activated position. The machine operator is thereby prevented from continuously operating the power press 10 by continuously holding the manual control means 24 in the on position. Instead, the movement of the manual control means 24 to the on position will permit the flow of electrical energy to the power means 18 for only a predetermined time period, notwithstanding the continued disposition of the manual control means 24 in the on position. To continue to operate the machine, the machine operator must permit the manual control means 24 to return to the off position and then subsequently move the manual control means 24 back to the on position. As with the motion switch timing means 50, movement of the manual control means 24 from the on to the off and back to the on position in an interval less than the predetermined time period of the manual control timing means 54 will retrigger the manual control timing means 54 and establish another complete time period. Therefore, by "pumping" the manual control means 24 in intervals less than the predetermined time period, the machine operator is able to maintain a continuous flow of electrical energy to the power means 18.

Like the motion switch timing means 50, the manual control timing means 54 includes adjusting means 56, such as a conventional rheostat, for manually adjusting the length of the predetermined time period of the manual switch timing means 54.

As illustrated in FIG. 1, the main power switch 42, with which the motion switching means 40 and motion switch timing means 50 are interconnected, and the manual control means 24, with which the manual control timing means 54 is interconnected, are themselves interconnected with the circuit 20 to form a series combination. Therefore, the manual control timing means 54 is operable in response to the movement of the manual control means 24 to the on position only when the motion switch timing means 50 is operable to permit the flow of electrical energy for a predetermined time period in the circuit 20 from the source 22 to the manual control means 24. The series combination requires the coordinated movement of the motion switching means 40 and the manual control means 24 to assure the flow of electrical energy through the circuit 20 to power the work forming member 16.

While one or more motion switching means 40 can be used and interconnected in various ways with the circuit 20, FIG. 2 illustrates a preferred circuit embodiment.

Referring first to FIG. 1, the motion switching means 40 includes a pair of motion switches, a left motion switch 58 being carried by the left wrist cuff 30, and a right motion switch 60 being carried by the right wrist cuff 32. Referring now to FIG. 2, the motion switch timing means 54 includes a corresponding pair of timing units, a left timing unit 62 being interconnected with the left motion switch 58 and a right timing unit 64 being interconnected with the right motion switch 60. In like fashion, the manual control means 24 is interconnected with a manual control timing unit 66.

The left and right timing units 62 and 64 and the manual switch timing unit 66 are interconnected with the circuit 20 to form a series combination, such that all three timing units 62, 64 and 66 must be simultaneously operable to complete the electrical circuit therethrough. In this combination, the operator is required to move both wrist cuffs 30 and 32 while operating the manual control means 24 to drive the work forming member 16.

The three timer units 62, 64 and 66 are identically constructed, therefore a detailed description of the left timer unit 62 will suffice to describe all. The left timer unit 62 includes a pair of conventional timer relays 68. Each timer relay 68 includes a switch 70 operatively interconnected with a conventional timed monostable circuit as previously described. The switch 70 is movable between a normally open position (shown in FIG. 2) to prevent the flow of electrical energy therethrough and a closed position to permit the flow of electrical energy therethrough for a predetermined time period. The switch 70 is movable to the closed position in response to movement of the left motion switch 58 to the activated position.

The pair of timer relays 68 is interconnected within the left timer unit 62 such that the pair of relays 68 is in parallel relation to the left motion switch 58 and series relation to each other. In this configuration, movement of the left motion switch 58 to the activated position will simultaneously move both switches 70 to the closed position and thus complete the circuit through the left timer unit.

Failure sensing means 72 is provided to detect the failure of individual timer relays 68 within each timer unit 62, 64 and 66. The failure sensing means 72 includes a cut-out relay 74 interconnected with the circuit means 20 to form a series combination relative to the three timer units 62, 64 and 66. The cut-out relay 74 is movable between a normally closed position (shown in FIG. 2) to permit the flow of electrical energy therethrough and an open position to prevent the flow of electrical energy therethrough. A failure monitor circuit 76 is operatively interconnected with the cut-out relay 74 and each timer unit 62, 64 and 66 to move the cut-out relay 74 to the open position should a failure of an individual timer unit 62, 64 or 66 occur. Specifically, the failure monitor circuit 76 is operable to detect a difference in voltage between the pair of timer relays 68 within an individual timer unit 62, 64 or 66, such as would occur should one timer relay switch 70 assume a different operational position relative to its twin timer relay switch 70.

Indicator means 78, such as a light or buzzer, is operable in response to movement of the cut-out relay 74 to the open position to notify the machine operator of the failure of any of the timer units 62, 64 or 66.

Each timer relay 68 within each timer unit 62, 64 and 66 may fail in either the open or closed position. In the circuit configuration illustrated, should one of the timer relays 68 fail in the open position, the timer unit circuitry itself will prevent the flow of electrical energy therethrough, preventing the flow of electrical energy to the power means 18. At the same time, the failure monitor 76 will sense the resulting voltage difference between the operative and inoperative timer relay 68 and activate the cut-out relay 74, and thus the indicator means 78, to notify the machine operator that the loss of electrical power to the power means 18 is the result of a failure of one of the timer units 62, 64 or 66 and not another malfunction.

Should one of the timer relays 68 fail in the closed position, the affected timer unit 62, 64 or 66 itself will continue to permit the flow of electrical energy therethrough. However, the failure monitor 76 will sense the resulting voltage difference and will operate the cut-out relay 74 to prevent the flow of electrical energy to the power means 18. Likewise, the indicator means 78 would notify the machine operator of the failure.

As illustrated in FIG. 2, each timing unit 62, 64 and 66 includes adjusting means 52 or 56. It is thus possible to adjust the length of the predetermined time period separately for each motion switch 58 or 60 to compensate for job cycle variations for each hand.

As heretofore described, the power means 18 of the machine 10 permits the work forming member 16 to cycle automatically in response to the continuous flow of electrical energy to the power means 18. Also as heretofore described, the coordinated movement of the left and right motion switches 58 and 60 and the manual control means 24 within the predetermined time intervals will permit a continuous flow of electrical energy through the circuit 20 to the power means 18. In an alternate construction, however, the power means 18 may be adapted to permit the work forming member 16 to cycle only once, notwithstanding the continuous flow of electrical energy to the power means 18. In this construction, the flow of electrical energy to the power means 18 must be first interrupted and then resumed to cause another single cycle of the work forming member 16.

The circuit 20 is adapted for use with the power means 18 which permits interrupted cycling of the work forming member 16 by the provision of an interruption switch 23 in the circuit 20 intermediate the source 23 and the interlock means 38. The interruption switch 23 is movable between a normally off position (as shown in FIG. 2) to prevent the flow of electrical energy through the interlock means 38, notwithstanding the disposition of the timer relays 68 in all the timer units 62, 64 and 66 in the closed position, and an on position to permit the flow of electrical energy through the interlock means 38 when the timer relays 68 are so disposed. The interruption switch 23 operates concurrently with the manual control means 24 and follows the movement of the manual control means 24 between the on and off positions. As should now be apparent, the inclusion of the interruption switch 23 operable in response to the manual control means 24 provides the necessary interruption in the flow of electrical energy to the power means 18 to cause the cycling of the work forming member 16.

Various of the features of the invention are set forth in the following claims.

What is claimed is:

1. A circuit interconnecting a source of electrical energy with a power operated machine, said circuit comprising interlock means including motion switching means which is adapted to be removably attached to the machine operator's body and is movable between a normally deactivated position to prevent the flow of electrical energy from the source to the machine and an activated position to permit the flow of electrical energy from the source to the machine for operating the machine, said motion switching means being operable to be moved to the activated position in response to movement of the operator's body, and said interlock means further including motion switch timing means operable, in response to movement of said motion switching means to the activated position, to permit the flow of electrical energy from the source to the machine for a predetermined time interval after said motion switching means has been moved to the activated position, said motion switch timing means including adjusting means for adjusting the predetermined time interval of said motion switch timing means.

2. A circuit interconnecting a source of electrical energy with a power operated machine, said circuit comprising interlock means including motion switching means which is adapted to be removably attached to the machine operator's body and is movable between a normally deactivated position to prevent the flow of electrical energy from the source to the machine and an activated position to permit the flow of electrical energy from the source to the machine for operating the machine, said motion switching means being operable to be moved to the activated position in response to movement of the operator's body, said interlock means further including manual control means connected to said motion switching means and movable between a normally off position to prevent the flow of electrical energy from the source to the machine, notwithstanding the disposition of said motion switching means in the activated position, and an on position to permit the flow of electrical energy from the source to the machine when said motion switching means is in the activated position, said manual control means being operable to be moved to the on position by the machine operator, said interlock means further including manual control timing means operable, in response to movement of said manual control means to the on position and when said motion switching means is in the activated position, to permit the flow of electrical energy from the source to the machine for a predetermined time interval after said manual control means has been moved to the on position.

3. A circuit according to claim 2 wherein said manual control timing means includes adjusting means for adjusting the predetermined time interval of said manual control timing means.

4. An apparatus including a power press and a circuit connected to said power press and adapted to be connected to a source of electrical energy, said power press comprising an electrically actuated power means interconnected with the electrical energy source by said circuit, a work bed, and a work forming member drivingly connected with said power means and mounted for reciprocative movement relative to said work bed, retraction means having an attachable portion removably attachable to at least one of the operator's wrists, said retraction means being operable for forcibly removing the operator's hands from the vicinity of said work bed in response to movement of said work forming member toward said work bed, said circuit comprising interlock means including motion switching means movable between a normally deactivated position to prevent the flow of electrical energy from the source to said power means and an activated position to permit the flow of electrical energy from the source to said power means for driving said work forming member, said motion switching means being carried by said attachable portion of said retraction means and operable to be moved to the activated position in response to movement of the operator's hand.

5. An apparatus according to claim 4 wherein said interlock means further includes motion switch timing means operable, in response to movement of said motion switching means to the activated position, to permit the flow of electrical energy from the source to said power means for a predetermined time interval after said motion switching means has been moved to the activated position.

6. An apparatus according to claim 5 wherein said interlock means further includes manual control means connected to said motion switch timing means and being movable between a normally off position to prevent the flow of electrical energy from the source to said power means, notwithstanding the operation of said motion switch timing means to permit the flow, and an on position to permit the flow of electrical energy from the source to said power means when said motion switch timing means operates to permit the flow, said manual control means being operable to be moved to the on position by the machine operator.

7. An apparatus according to claim 6 wherein said interlock means further includes manual control timing means operable, in response to movement of said manual control means to the on position when said motion switch timing means operates to permit the flow, to drive said work forming member for a predetermined time interval after said manual control means has been moved to the on position.

8. An apparatus according to claim 7 wherein said attachable portion of said retraction means includes a left wrist cuff and a right wrist cuff, wherein said motion switching means includes a left motion switch carried by said left wrist cuff and a right motion switch carried by said right wrist cuff, and wherein both of said left and right motion switches are interconnected with said interlock means such that both of said left and right wrist cuffs must be moved to operate said motion switch timing means.

9. An apparatus according to claim 8 wherein said motion switch timing means includes a left wrist cuff timing means interconnected with said left motion switch and a right wrist cuff timing means interconnected with said right motion switch.

10. An apparatus according to claim 9 wherein both of said left and right wrist cuff timing means include adjusting means for individually adjusting the respective predetermined time intervals of said left and right wrist cuff timing means.

11. An apparatus according to claim 10 wherein said manual control timing means includes adjusting means for adjusting the predetermined time interval of said manual control timing means.

12. A safety device according to claim 9 and further including a failure sensing means for sensing a failure of one of said left wrist cuff timing means, said right wrist cuff timing means, and said manual control timing means, said failure sensing means being movable between a normally closed position to permit the flow of electrical energy to said power means and an open position to prevent the flow of electrical energy to said power means, said failure sensing means being movable to the open position in response to the failure and adapted to notify the machine operator of the failure.

* * * * *